Oct. 3, 1967     A. P. WILDER     3,344,822
SAW BLADE
Filed July 19, 1965
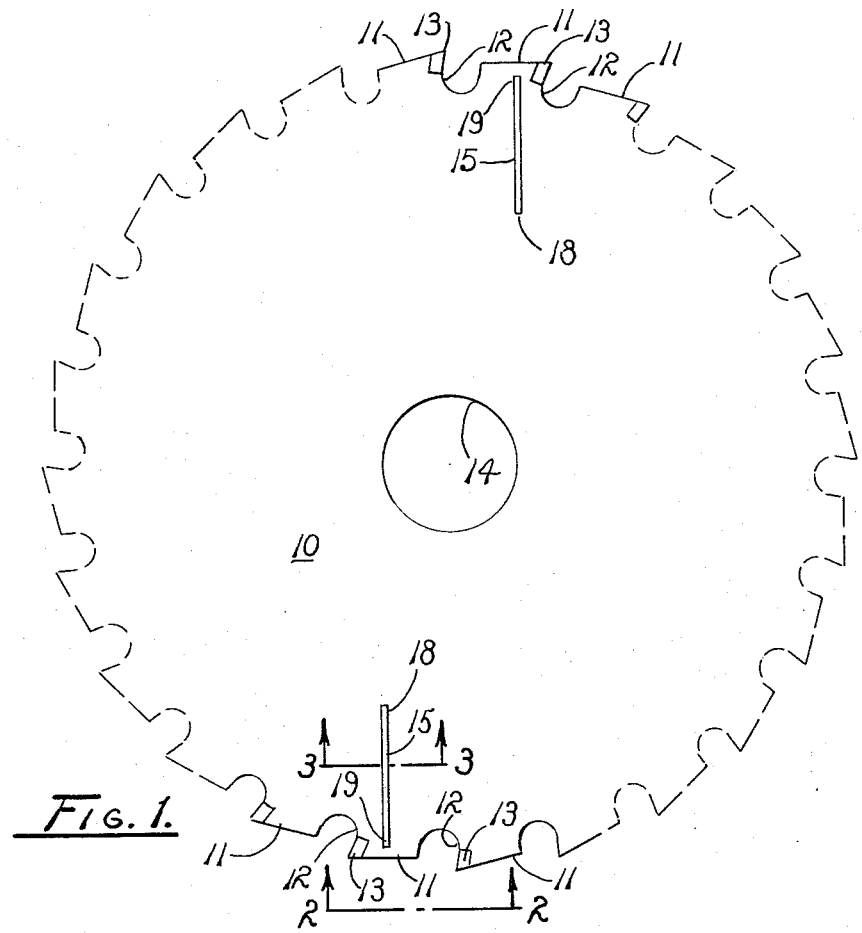
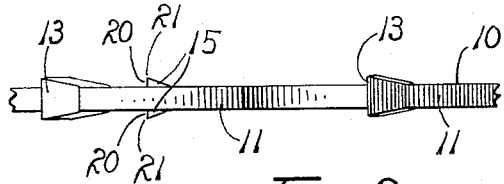
Fig. 2.
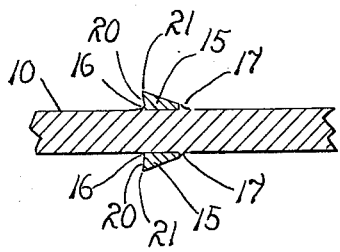
Fig. 3.
ARCHIE P. WILDER
INVENTOR
Huebner & Worrel
ATTORNEYS 3,344,822
SAW BLADE
Archie P. Wilder, 3252 Brown Ave.,
Fresno, Calif. 93703
Filed July 19, 1965, Ser. No. 472,931
3 Claims. (Cl. 143—140)

ABSTRACT OF THE DISCLOSURE

A circular saw blade having peripheral teeth and opposite sides with substantially straight elongated ribs integral with the blade disposed in corresponding positions on opposite sides of the blade serving to strengthen the blade, to space opposite sides of the blade from workpieces being cut to define air spaces along opposite sides of the blade, and during rotation to blow air radially of the blade through said spaces to cool the blade and the teeth.

---

This invention relates to a saw blade and more particularly to an improved saw blade which minimizes binding and jamming and which forms a smooth cutting surface.

It is recognized that the present invention has a wide variety of applications to various types of both manual and power driven saw blades. However, for illustrative convenience, its application to a rotary type saw blade is described. Moreover, it is also recognized that saw blades of this type may be used in cutting a variety of types of workpieces. However, also for illustrative convenience the workpieces referred to are wood or those having characteristics similar to that of wood.

In the utilization of conventional rotary saw blades the friction of the workpieces against the blades frequently causes the blades to heat to high temperatures. These high temperatures have detrimental effects on the blades, such as altering the temper thereof to reduce the hardness and even warping and distorting the blades. The reduction in hardness makes the cutting points susceptible to wear thus shortening the working life of the blades. The heat produced in such sawing operations also raises the temperatures of the workpieces. Frequently the temperatures produce burning of the severed surfaces of the workpieces thus, in many instances, diminishing their usefulness. Furthermore, the high temperatures produced in the saw blades and the workpieces restrict their handling. Hence, it is sometimes necessary to allow the blades to cool before making further cuts, or the workpieces to cool before further processing.

Another problem encountered in the use of a conventional rotary saw blade is that of its binding within the workpiece. Not only may this necessitate repositioning of the blade or the making of a new cut, but may also result in deforming of the blade and/or the workpiece so as to preclude their further utility.

The danger of binding of the blade, or partial binding necessitating the use of more power to perform the cutting operation, restricts the number of saw blades that can be used on a single arbor in battery cutting operations. Cutting residue in many instances gathers during the cutting operation causing the saws to bind within the workpieces. Also, the residue gathers around the arbors, thus impeding rotation of the blades. Further, residue gathering within the cuts in combination with the heat produced in the cutting operations greatly increases the hazards of fire.

The results of the cutting operations usually leave something to be desired and not infrequently require further processing of the workpieces. Not only are the severed surfaces frequently burned, but cutting marks left by the saw blades are usually readily observable and require planing or sanding in instances in which the workpieces must meet the exacting requirements of finished work.

It is, therefore, an object of the present invention to provide an improved saw blade.

Another object is to provide such a saw blade which does not produce excessive heat during the cutting operation.

Another object is to provide a saw blade which avoids or minimizes burning of workpieces.

Another object is to provide a saw blade which will not bind within workpieces cut thereby.

Another object is to provide a saw blade which automatically removes the cutting marks of the saw from its workpiece.

Another object is to provide a rotary saw blade which may be deployed with several other similar blades along the same axis of rotation for more effective battery operation than previously attained.

Another object is to provide a saw blade which automatically removes cutting residue from the cut area.

Another object is to provide a rotary saw blade which forces cutting residue away from its axis of rotation.

Another object is to provide a rotary saw blade of simple construction which performs the above functions.

A further object is to provide a rotary saw blade which has a longer operating life.

A still further object is to provide a rotary saw blade which is durable, resists warping and distortion, requires a minimum of maintenance, and is economical to provide and utilize.

Other objects and advantages will become more fully apparent upon reference to the subsequent description in the specification.

In the drawing:

FIG. 1 is a side view of a rotary saw blade embodying the principles of the present invention showing the arrangement of two of the plurality of cutting elements disposed on the periphery of the blade with the positions of the other cutting elements schematically represented for illustrative convenience.

FIG. 2 is an enlarged fragmentary edge view of the rotary saw blade showing the saw teeth and cutting elements viewed from line 2—2 of FIG. 1.

FIG. 3 is an enlarged fragmentary cross section of a cutting element, taken on line 3—3 of FIG. 1.

Referring in greater detail to the drawing:

In FIG. 1, a disk-like saw blade or plate, generally indicated at 10 having opposite surfaces provides a plurality of saw teeth 11 disposed in spaced relation about its periphery. Each tooth 11 affords a leading edge 12 relative to the direction of intended rotation of the blade 10. To each such edge 12 is affixed as by welding, brazing, or the like a replaceable cutting point 13 constructed of a metal of suitable hardness for the cutting operation such as tungsten carbide or hard carbon steel. The blade is adapted to be mounted for rotational movement about an arbor, not shown, through the use of a centrally positioned mounting hole 14.

Each surface of the blade 10 affords a plurality of substantially radial linear planing elements 15 in spaced relation and constructed of a metal of suitable hardness, as tungsten carbide or hard carbon steel and mounted by such suitable means as welding, brazing, or the like at positions 16 and 17 as shown in FIG. 3. Each element, having inner and outer ends 18 and 19, respectively, relative to the center of the blade, is in back-to-back relation with a corresponding element 15 on the opposite surface of the blade. The planing elements 15 extend from their outer ends 19, near the periphery of the blade, inwardly to the inner ends 18 a distance preferably equal to, or greater than, the normal depths of the cuts to be made by the blade. The total width or thickness of each pair of back-to-back elements 15, including the blade therebetween, is substantially equal to the width of the cutting point 13, as shown in FIG. 2. Each planing element 15, as shown in cross section in FIG. 3, provides a forwardly projecting leading surface 20 relative to the intended direction of rotation of the blade thus providing a cutting or scraping edge 21. The elements 15 are disposed about the surfaces of the blades 10 with their outer ends 19 adjacent to the periphery of the blade in following and slightly overlapping relation to their respectively adjacent cutting points 13. The planing elements are extended inwardly and slightly forwardly with respect to the direction of blade relation in substantially tangential relation to the mounting hole 14. Thus, the outer ends are slightly rearwardly of the inner ends so that a component of outward thrust is imparted to all sawdust and workpiece material encountered by the planing elements during rotation of the blade. Further, the cutting edges 21 engage the workpieces at opposite sides of saw cuts being made in a scraping action which is outwardly progressive due to the oblique disposition of the planing elements relative to the circular orbital paths of travel.

OPERATION

The operation of the described embodiment of the subject invention is believed readily apparent and is briefly summarized at this point.

The blade 10 is employed in the conventional manner of operation and requires no special maintenance other than occasional sharpening of the planing elements 15 and/or replacement of the points 13. As described, the blade is mounted for rotational movement on any suitable arbor, not shown. Several of the blades may be mounted on a single arbor in battery arrangement so that several cuts can be made in one operation.

As the saw blade 10 is rotated and moved in the plane across a workpiece, the cutting points 13 provide durable and highly effective cutting action and form a saw cut of predetermined width. It will be noted that the points are extended outwardly and forwardly with respect to the direction of blade rotation to achieve an effective clawing or snagging action in contrast with the outwardly and rearward extension of the planing elements which eject the sawdust formed by the points. As the blade rotates, the elements 15 operate with a shaving or planing action on opposite sides of the saw cut to smooth the cut surfaces of the workpiece. Thus as quickly as saw marks are formed on the severed surfaces, they are removed by the planing elements. Their extension from the surfaces of the blade at right angular distances equal to that of the cutting points 13 is effective to remove cutting marks while providing negligible resistance to the movement of the blade. The planing action of the elements substantially eliminates the danger of the blade binding within the workpiece. If any portion of the workpiece acts to bind against the surfaces of the blade, it is removed by the action of the elements 15. Further, since any portion of the workpiece that impinges upon the surfaces of the blade is removed, the friction and abrasion between the workpiece and the blade 10 is effectively reduced. Consequently, less heat is developed. Further the rapid orbital travel of the planing elements in their described disposition throws air outwardly on opposite sides of the blade in a cooling action of novel effectiveness. Hence, the danger of blade distortion and excessive wear due to heat is substantially diminished. Furthermore, since there is less heat developed than in a conventional sawing operation and since there is no direct contact between the surface of the blade 10 and the workpieces because of the planing elements therebetween, the danger of burning the workpieces is greatly reduced. Moreover, any traces of burning that may take place are removed through the planing action of the elements. Cutting residue or sawdust does not gather within the cut during the cutting operation as with conventional saws. Such residue is forced out of the cut area by the planing elements as they move therethrough. Thus, not only is the danger of the residue binding the blade within the cut reduced, but the possibility that the residue may be ignited by the heat produced during the operation is avoided. The described positions of the planing elements also act to deflect residue from the axis of rotation of the blade. Thus, residue is restrained from gathering about the arbor so that it cannot restrict the rotation of the blade.

With the problems of binding, distortion, and excessive wear of the blade substantially eliminated, several such saw blades can be mounted for rotational movement on a single arbor without the previous consequent hazardous jamming. Thus, several cuts can be made in the time it takes conventional equipment to make one cut.

The present invention provides a saw blade which eliminates the major difficulties encountered in conventional sawing operations while also providing a saw blade that requires no special maintenance and is efficient and durable.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. A rotary saw blade comprising:
  (A) a circular plate having opposite sides, a concentric mounting opening, and a predetermined direction of operational rotation;
  (B) cutting teeth disposed about the periphery of the plate including points having forwardly disposed surfaces extended inwardly and rearwardly with respect to the direction of rotation and oppositely axially extended from the plate and terminating in predetermined planes spaced from the plate; and
  (C) elongated planing elements integral with opposite sides of the plate having longitudinal scraping edges disposed forwardly of said direction of rotation and oppositely extended from the plate distances substantially equal to the opposite axial extension of the cutting points, said elements being disposed substantially radially of the plate and exercising a radial blowing effect during rotation of the plate to cool the plate and teeth and to blow sawdust outwardly therefrom.

2. A rotary saw blade comprising:
  (A) a circular plate having opposite sides, a concentric mounting opening, and a predetermined direction of operational rotation;
  (B) cutting teeth disposed about the periphery of the plate including points having forwardly disposed surfaces extended inwardly and rearwardly with respect to the direction of rotation and said teeth terminating in predetermined planes axially spaced from the plate; and
  (C) substantially straight elongated planing elements integral with opposite sides of the plate disposed substantially radially thereof having outer ends extended in outwardly overlapping relation to the cutting points, inner ends inwardly and forwardly extended with respect to the direction of operational rotation, and forwardly disposed scraping edges, said scraping edges being disposed substantially in said planes of termination of the teeth, said elements blowing air outwardly between the teeth during rotation of the plate to cool the teeth and to discharge sawdust outwardly therefrom.

3. A saw blade comprising a circular imperforate plate adapted for mounting in an arbor for rotation therewith in a predetermined direction and providing opposite surfaces and a circumscribing series of teeth having cutting points, and a plurality of elongated substantially straight rib elements disposed in corresponding positions on opposite sides of the plate, said rib elements being bonded integrally to the plate and disposed substantially radially of the plate, each having an outer end rearwardly adjacent to the cutting point of a tooth, and during operation said ribs serving to strengthen the plate and to space the opposite sides of the plate from material being sawed to define air passages between said faces and the material and functioning during rotation to throw air through said passages radially of the plate to cool the plate and to blow sawdust outwardly from the cutting points.

References Cited

UNITED STATES PATENTS

| | | | |
|---|---|---|---|
| 60,827 | 1/1867 | Bee | 143—143 |
| 192,526 | 6/1877 | Pool | 143—140 |
| 877,799 | 1/1908 | Rider | 143—140 |
| 2,659,398 | 11/1952 | Marvin | 143—140 |

DONALD R. SCHRAN, *Primary Examiner.*